United States Patent [19]

Hashimoto

[11] Patent Number: 4,829,555
[45] Date of Patent: May 9, 1989

[54] TAD INCORPORATED WITH VCR

[75] Inventor: Kazuo Hashimoto, Tokyo, Japan

[73] Assignee: Hasimoto Corporation, Tokyo, Japan

[21] Appl. No.: 55,614

[22] Filed: May 29, 1987

[30] Foreign Application Priority Data

May 31, 1986 [JP] Japan .................. 61-126801

[51] Int. Cl.⁴ ............................. H04M 1/65
[52] U.S. Cl. ....................... 379/70; 358/335
[58] Field of Search ............. 379/53, 102, 104, 54, 379/105, 70, 71, 73, 74, 77, 79, 82, 110; 358/85, 335; 360/33.1

[56] References Cited

U.S. PATENT DOCUMENTS

| | | | |
|---|---|---|---|
| 4,427,847 | 1/1984 | Hofmann | 379/110 |
| 4,540,851 | 9/1985 | Hashimoto | 379/105 |
| 4,625,080 | 11/1986 | Scott | 379/77 |
| 4,658,417 | 4/1987 | Hashimoto et al. | 379/105 |

FOREIGN PATENT DOCUMENTS 61-128664  6/1986  Japan .................... 379/53

OTHER PUBLICATIONS

Temime et al., *A 2,048 MBit/s Videoconferencing Codec*, Commutations & Transmission, No. 4, 1983, pp. 33-50.

*Primary Examiner*—Alan Faber
*Assistant Examiner*—James E. Tomassini
*Attorney, Agent, or Firm*—Lowe, Price, LeBlanc, Becker & Shur

[57] ABSTRACT

A system for automatic telephone answering picture/sound recording and a device therefor records both a television program and an incoming message from a calling party on a common video tape. Upon detection of a telephone ringing signal, the telephone line is engaged and then, to effect picture/sound recording of a telecast, the video tape is set in a standby mode, and at the same time an outgoing message is transmitted. Upon completion of the transmission of the outgoing message, the standby mode is cancelled to operate the recording section and then the incoming message is recorded on the video type. Further, restoration to a standby mode is made after the message recording is completed.

12 Claims, 6 Drawing Sheets

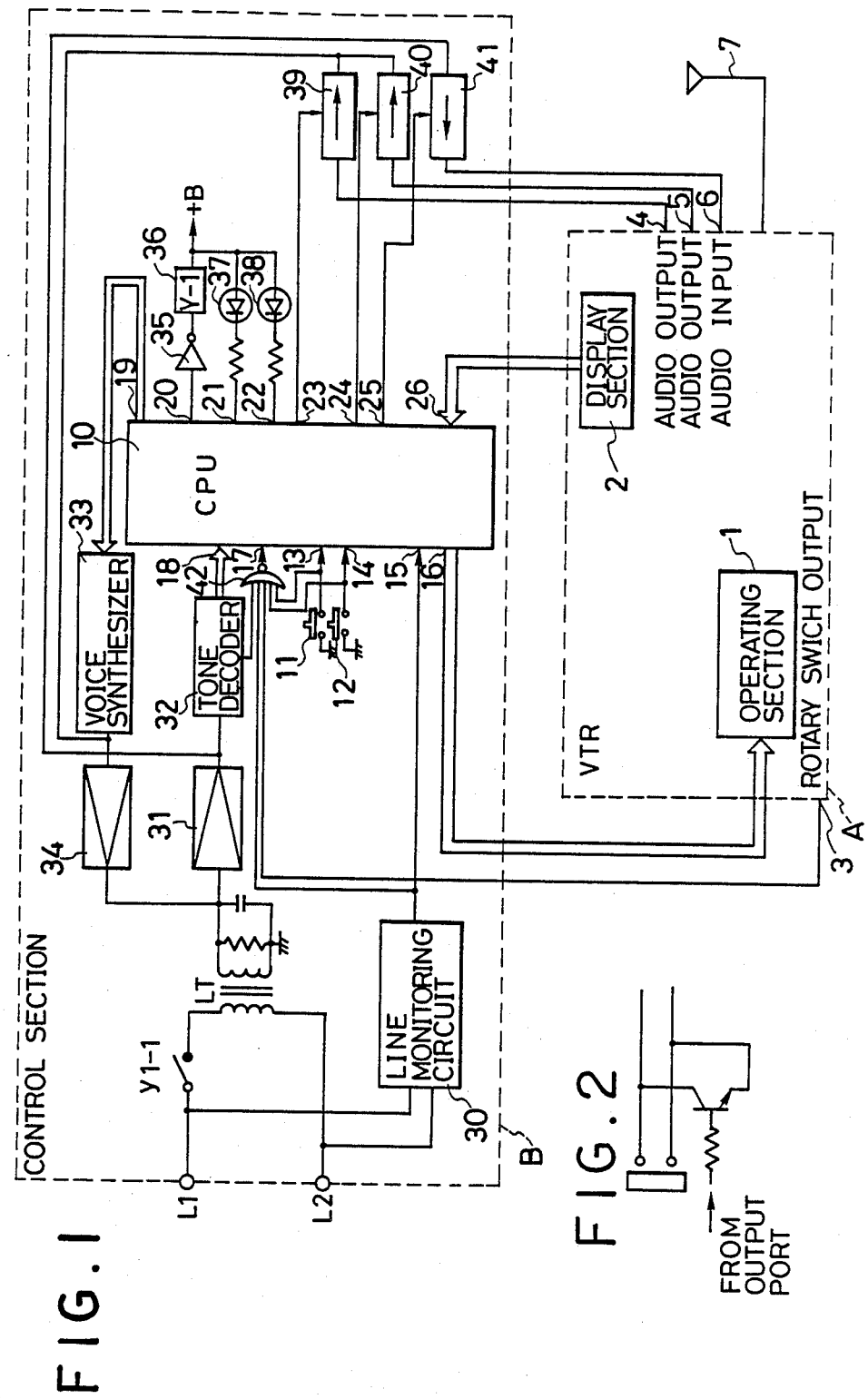

FIG. 3

| CODE | FUNCTION | OUTPUT PORT |
|---|---|---|
| 0 | POWER ON/OFF | P10 |
| # | ONE-TOUCH MOTION TIMER (ONCE FOR 30 MIN. PICTURE REC.) | P11 |
| * | ONE-TOUCH MOTION TIMER (ONCE FOR 30 MIN. UNTIL INITIATION OF PICTURE REC.) | P12 |
| * 1 | PICTURE REC. | P13 |
| * 2 | REWIND | P14 |
| * 3 | PLAYBACK | P15 |
| * 4 | FAST WIND | P16 |
| * 5 | STOP | P17 |
| * 6 | PAUSE | P20 |
| # 1 | 1 CH | P21 |
| # 2 | 2 CH | P22 |
| ⋮ | ⋮ | ⋮ |
| # 12 | 12 CH | |

TAD INCORPORATED WITH VCR

BACKGROUND OF THE INVENTION

The present invention relates to a system for automatic telephone answering picture/sound recording and a device therefor, in which a remote controlled television picture/sound recording effected through telephone line, and an automatic caller's message recording effected upon reception of a telephone incoming call, are performed by the use of a common recording medium composed of a video tape.

A device, which performs a remote control of a television picture/sound recording device (such as a VCR) through television line, has been known in U.S. Pat. No. 4,540,851, for instance. On the other hand, a variety of automatic telephone answering devices of a type automatically responding to a telephone call to record a caller message have been developed by the present applicant over the last thirty years and well known. However, these two kinds of devices have been utilized independently from each other, since no relationship has been found between them.

SUMMARY OF THE INVENTION

A first object of the present invention is to enable a television picture/sound recording device and a calling party's message recording device responsive to a telephone incoming call to utilize a video tape as a common recording medium.

A second object of the present invention is to selectively effect the recording of a calling party's message either simultaneously with or independently from the television picture/sound recording.

A third object of the present invention is to enable a calling party to easily confirm, via a voice, a channel previously set and a channel selected by remote control when he calls out an automatic telephone answering picture/sound recording device to operate the same device.

A fourth object of the present invention is to permit a television picture/sound recording section to operate independently even when a message recording section is restored to the original mode.

A fifth object of the present invention is to effect an operation required for calling party's message recording in response to a telephone incoming call even when a television picture/sound recording section is restored to the original mode.

The present invention has other objects of achieving various functions mentioned hereinbelow.

According to the present invention, an automatic telephone answering picture/sound recording system and a device therefor are provided.

The system comprises a picture/sound recording section for receiving a telecast, and a message recording section responsive to a telephone incoming call for recording a calling party's message, wherein both of the sections employ a common video tape.

The device, in a first embodiment, is arranged to record both of an incoming message from the calling party and a telecast onto a common video tape, and comprises a ringing signal detecting means for detecting a ringing signal sent through a telephone line, an engaging means for engaging the telephone line upon detection of the ringing signal, a picture/sound recording section for effecting the picture/sound recording of the telecast, means for setting said picture/sound recording section in a ready mode upon detection of the ringing signal, an answering means for transmitting an outgoing message upon engagement of the telephone line, a disengaging means for cancelling the ready mode upon completion of the transmission of the outgoing message, a recording means for recording the incoming message onto the video tape after cancellation of the ready mode, and a first restore means for disabling a recording operation of said recording means to establish a standby mode when the incoming message recording is completed.

The device of the present invention comprises, in a second embodiment, a first detecting means for detecting whether or not a television program is being recorded when a ringing signal is received, a recording means for recording an incoming message onto a predetermined sound track of a video tape while the picture recording is being effected, a second restore means for disabling the incoming message recording operation of said message recording means and setting said message recording means in a standby mode to ready for reception of a subsequent telephone incoming call, and for permitting the picture recording of the television program to continue, after completion of the incoming message recording.

The device of the present invention comprises, in a third embodiment, a second detecting means for detecting whether or not a picture/sound recording section is operating while an incoming message is being recorded, a restarting means for restarting an operation of a picture/sound recording section when said second detecting means detects the inoperative picture/sound recording section by the timer operation or the like during the incoming message recording, so as to continue the incoming message recording, and a third restore means for disabling the operation of the picture/sound recording section and establishing a standby mode to ready for reception of a subsequent telephone incoming call, after completion of the incoming message recording.

The device of the present invention comprises, in a fourth embodiment, a storing means for storing therein start and stop positions of each of incoming messages recorded onto a video tape, respectively, and a playback means for automatically discriminting message recording portions of the video tape from picture recording portions thereof in accordance with stored contents of said storing means to playback the incoming messages alone.

The present invention is advantageous in employing a common recording medium or a video tape for both of a television picture/sound recording device and an automatic telephone answering/recording device, to thereby form these devices into a composite unit, and in effecting a channel selection and a television program appointment in the picture/sound recording device and a video tape operation in an arbitrary manner through telephone line, and is thus greatly and practically advantageous as household device in information-oriented era.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a circuit diagram of embodiments of the present invention;

FIG. 2 is a view showing a connection between a switching transistor and a corresponding operating button of a picture/sound recording section for turning on/off the same button in accordance with a control signal;

FIG. 3 is a view showing a relationship among tones or codes sent from a pushphone, associated functions and associated outputs of a CPU.

DETAILED DESCRIPTION

Figure 4:
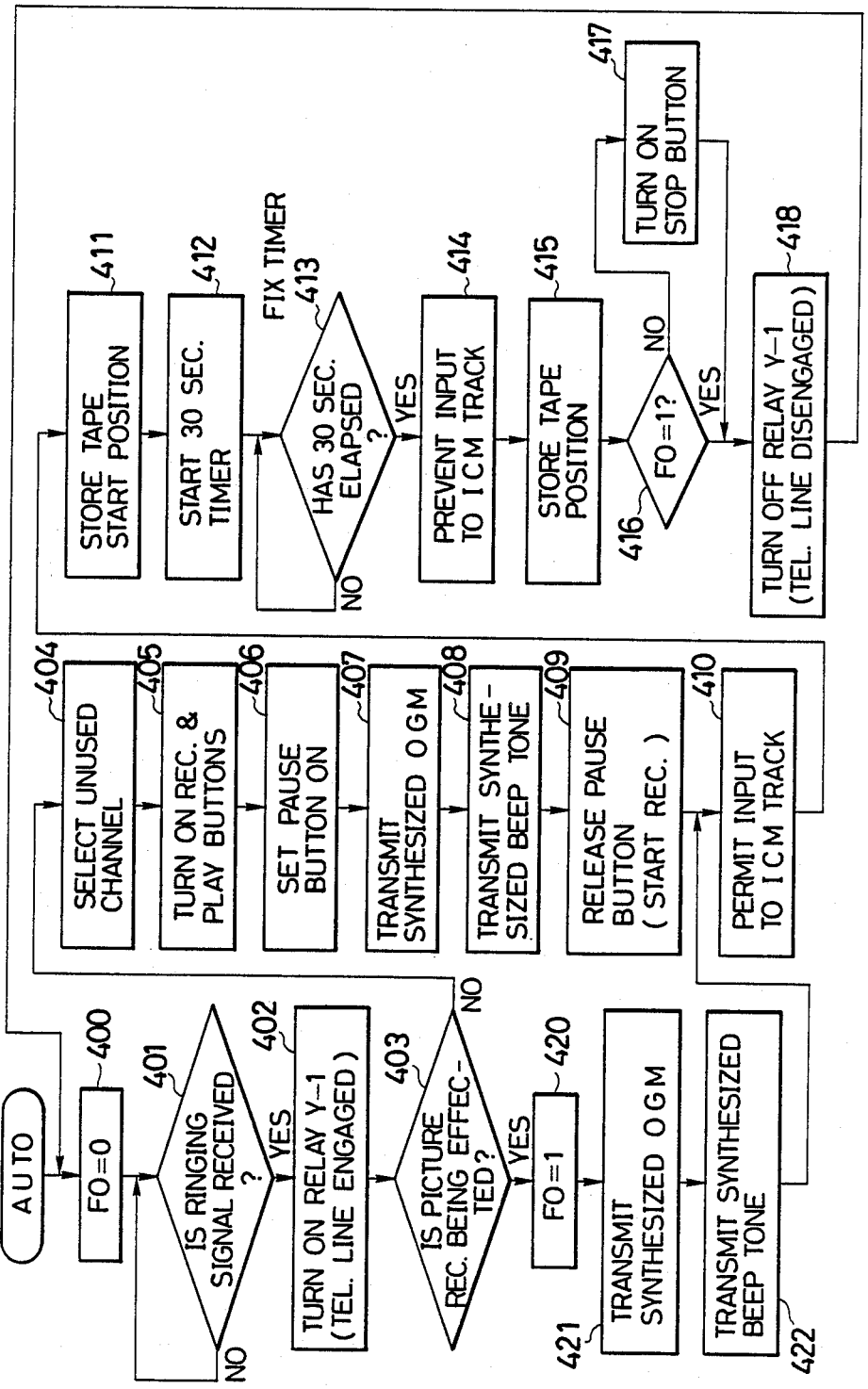
FIG. 4–7 are views showing operations of the embodiment of the present invention.

Referring to FIG. 1, reference symbol A designates a section (hereinafter referred to as a VTR) similar to a so-called video tape recorder, which has a picture-/sound recording section for receiving a telecast, and an incoming message (herein after called as I.C.M.) recording section for recording a message sent from a calling party, and B designates a control section for controlling the VTR in accordance with a ringing signal and a remote control signal sent from a telephone set. In the VTR A, an operating section 1 is provided, which includes various buttons for picture recording, rewind, playback, etc., which are normally pressed manually to operate said VTR. In order to operate VTR from remote location by the ringing signal from the telephone, a switching transistor of FIG. 2 is connected to each terminal of each said button and these switching translations are turned on in accordance with signals supplied from output ports of a CPU mentioned later to perform the same function as those achieved by ordinary manual button operations. Reference numeral 2 denotes a display section for displaying a time period for picture recording, a channel, etc. which are set in accordance with a remote control operation mentioned later, and outputs of the display section 2 are supplied to input ports of the CPU mentioned later to make it possible to confirm the thus set recording time period and channel, etc. Reference numeral 3 denotes an output from a rotary switch for detecting a start position or a terminal end position of a tape mounted in the VTR, which output is supplied to an interruption terminal of the CPU mentioned later, to cause a memory device in the CPU to store start and end positions of I.C.M.'s recorded on the tape. Reference numerals 4 and 5 denote audio output terminals, and 6 an audio input terminal. The VTR, in this device, is of a HiFi video tape recorder type, and is thus arranged to record a television voice and I.C.M.'s on a HiFi track and a conventional sound track, respectively. However, it may be possible to record the messages on the HiFi track, depending on cases. Accordingly, the audio output terminals 4, 5 are assigned to television recording and message recording, respectively, and the audio input terminal 6 is assigned to message recording. Reference numeral 7 denotes an antenna.

In the control section B, reference numeral 10 denotes a CPU of a one-chip microcomputer, 11 a push button switch for operating the present device as an automatic telephone answering device, 12 a push button switch which is operated for playing back I.C.M.'s recorded on the tape of the VTR. Further, reference numeals 13 and 14 denote input ports employed for detection of depression of these button switches. Reference numeral 15 designates an input port to which supplied is an output from a line monitoring circuit 30 for detecting a ringing signal and a voltage change in telephone line which occurs when the calling party hangs up the telephone. Further, reference numeral 16 denotes a plurality of output ports connected to the operating section 1 through switching transistors, 17 an interruption terminal, 18 a plurality of input ports. When the user sends the predetermined remote control signal by the push-button phone from a distant location, said signal is amplified by an amplifier 31 and decoded by a tone decoder 32. Then said coded signal is supplied to the input ports 18. Reference numeral 19 denotes a plurality of output ports from which a required coded signal is outputted in dependence on an associated condition to drive a voice synthesizer 33, to transmit outgoing message (hereinafter called as O.G.M.), instruction message, channel number, etc. onto the telephone line through an amplifier circuit 34. Reference numeral 20 denotes an output port for holding the relay Y-1 in an ON state via a driver 35, so as to engage the telephone lines L1, L2 with each other through a contact y-1-1 of the same relay upon detection of the above-mentioned ringing signal. Reference numeral 21 designates an output port for turning on a light-emitting diode 37 for indication of reception while I.C.M. is recorded on the VTR tape. Further, reference numeral 22 denotes an output port for turning on a light-emitting diode (AUTO) 38 when the present device is set in an automatic answering/recording mode in the above-mentioned manner. Further, reference numerals 23, 24 and 25 denote output ports for controlling analog switches 39, 40 and 41, respectively, 26 a plurality of input ports to which an output from the above display section 2 is supplied.

The present telephone answering device comprises the above-mentioned parts, and the operation thereof will be now explained with reference to flowcharts of FIGS. 4–8. Upon depression of the operating button 11 (AUTO) shown in FIG. 1, the present device is set in its automatic answering and picture/sound recording mode, and the program advances to the flowchart of FIG. 4. At this time, the VTR tape is rewound up to its start position, where required. Under these conditions, when an incoming call is transmitted from an unspecified person onto the telephone lines L1, L2, the incoming call is detected by program via the line monitoring circuit 30 and the input port 15, and thus the program advances from the step 401 to the step 402 of the flowchart of FIG. 4. At the step 402, an output from the output port 20 is set at its H level to hold the relay Y-1 in an ON state via the driver 35. Thus, the telephone lines are engaged with each other through the contact y1-1 of the relay Y-1 and the primary winding of the line transformer LT. At this time, the ringing signal is ceased and a voice circuit is established.

At the subsequent step 403, it is checked whether or not the VTR is being operated for picture recording. More particularly, as the display section 2 of VTR represents that the picture recording is being effected, the output from the display section 2 of the VTR is supplied to the input port 26 to check it. If no picture recording is being effected, the program advances to the step 404 to select an unused channel, 5CH (channel), for instance. The reason for doing this is that an I.C.M. alone should be recorded, but no picture recording is required. At the subsequent step 405, a recording (REC) button and a playback (PLAY) button in the operating section 1 of the VTR are turned on simultaneously. In actual, these buttons are not depressed manually, but terminals thereof are short-circuited through switching transistors of FIG. 2. Thus, the loading mechanism of the VTR is operated so that the tape is wound around the rotary head (not shown) within about 4 seconds. At the subsequent step 406, a pause button is turned ON. Accordingly, after wound around the rotary head at the step 405 the tape is not driven, but kept in its ready mode where it is stopped. At the subsequent step 407, a predetermined coded output is generated from the output port 19, to output a predetermined O.G.M. from the voice synthesizer 33. Since the above-mentioned tape loading is effected by the VTR itself, and the steps 405-407 are completed immediately, the tape loading is completed while the O.G.M. is being transmitted at the step 407. The O.G.M. is amplified by the amplifier 34 and is then sent to the calling party through the line transformer LT. Upon completion of transmission of the O.G.M., the beep tone is sent for about 0.5 seconds (at the step 408), and the program advances to the step 409. In this step 409, the pause mode established at the step 406 or the ready mode is cancelled, so as to start the tape in a recording mode. Next, at the step 410, the output port 25 is set at its H level to turn the analog switch 41 on, to permit the I.C.M. to be supplied to the audio input 6. Accordingly, if the calling party speaks his or her message after hearing the beep tone, the I.C.M. is supplied to a stationary head (not shown) via the line transformer LT, the amplifier circuit 31 and the analog switch 41, to be recorded on the sound track. Upon start of the tape, the tape start position is stored at the step 411. More specifically, for doing this, a number of pulses generated from the output 3 of the rotary switch (not shown) responding to tape travel and indicative of an amount of tape travel (tape position) from the tape start position is counted, and the thus counted number of pulses is stored into a memory device (not shown) in the CPU. At the subsequent step 412, a program timer is started for limiting a recording time of the I.C.M. up to 30 seconds. Then, upon elapse of 30 seconds at the step 413, the message is prevented from being inputted to the sound track which has been enabled at the step 410, and the tape position at that time is stored (step 415). At the subsequent step 416, the content of flag FO is checked. If it is determined at the step 403 that no picture recording in the VTR is being effected, the flag FO is set at "0" (at the step 400), and hence the program advances from the step 416 to the step 417 where a STOP button is turned ON (actually, contacts thereof are short-circuited as mentioned above) to terminate the tape travel. Thereafter, the relay Y-1 is turned OFF to release the engagement of the telephone line, so as to establish a standby mode ready for subsequent incoming call at the step 401 (a first restore means) through the step 400.

On the other hand, in the event that an incoming call is transmitted during the picture recording in the VTR effected by remote operation or by manual operation by the user at home, the program advances from the step 403 to the step 420 to set the flag FO to "1". Then, the O.G.M. and the beep tone are transmitted (at the steps 421, 422), and the program advances to the step 410. As a consequence, the program does not pass through the step 404, and thus the I.C.M. is recorded on the sound track by the stationary head, while the picture recording onto a channel set beforehand is performed. Further, since the program does not pass through the step 417 even after the I.C.M. recording is completed, the I.C.M. recording section returns to the standby mode, with the picture recording continued (a second restore means). To be noted, if the calling party hangs up his telephone before elapse of the maximum time period of 30 seconds for I.C.M. recording, a voltage change in the telephone line is read by the line monitoring circuit 30 to render the CPU interrupted, so as to restore the present system in the standby mode. A flowchart therefor is omitted.

Figure 5:
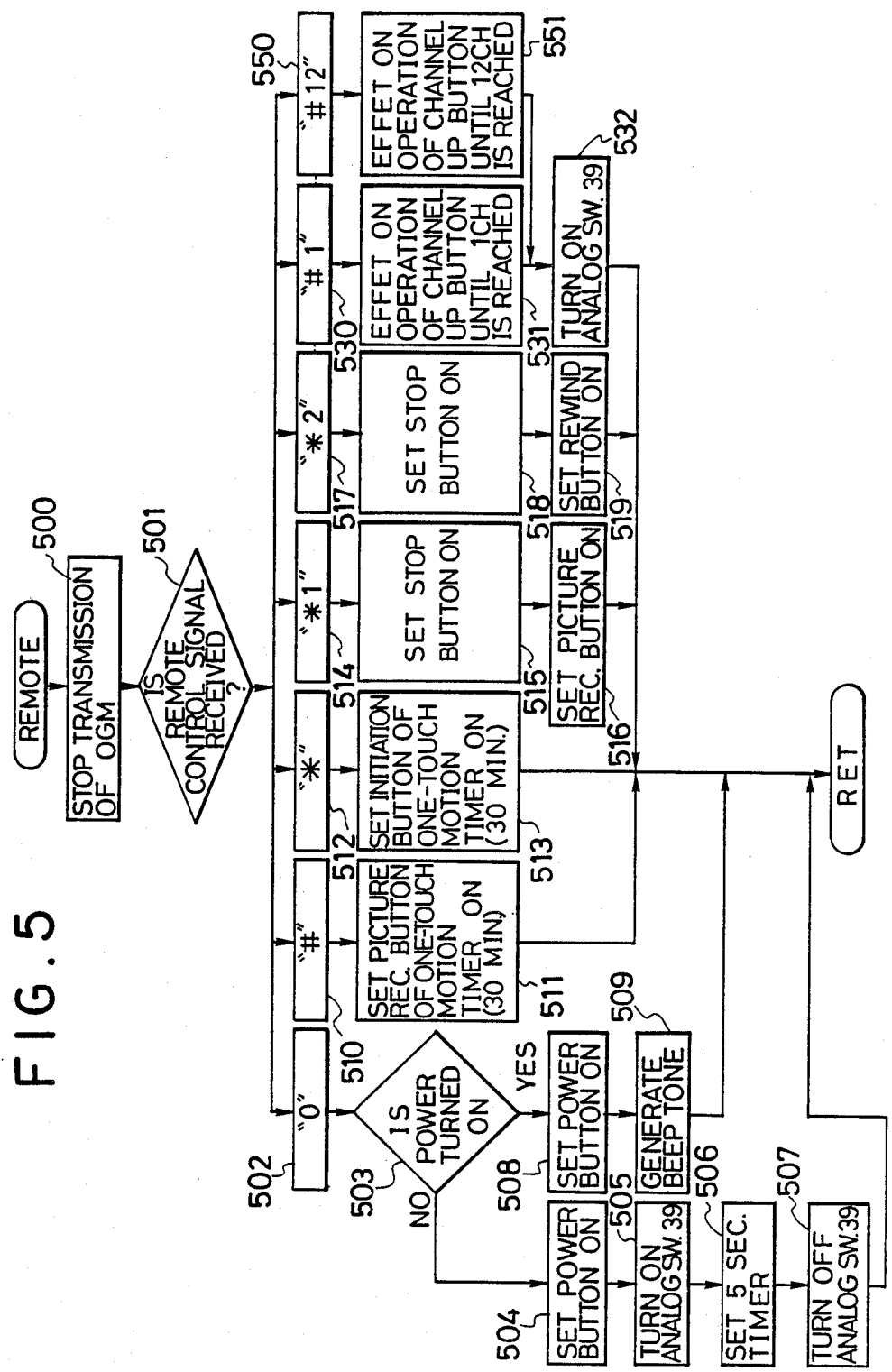

Next, with reference to the flowchart of FIG. 5, the operation of the present device in the case of remote control of the VTR effected by the user from a distant location will be explained. In this embodiment, various tones generated from a pushphone are utilized as remote control signals, and are assigned in a manner as shown in FIG. 3. At first, when the user calls out the present device from a distant location, he is permitted to hear the synthesized O.G.M. as mentioned above. Then, if he depresses the "0" button of the pushphone for turning on/off the power to send a corresponding remote control signal, an associated tone is supplied to the tone decoder via the line transformer LT and the amplifier circuit 31 of FIG. 1 and decoded by the same tone decoder. In the event that any one of tones is inputted, an interruption request is supplied to the interruption terminal 17 of the CPU through an NOR gate 42, the program jumps to the flowchart of FIG. 5. At the step 500, the trasmission of O.G.M. is terminated. This makes it possible for the user to know that the remote control is initiated. Then, the program advances via the steps 501 and 502 to the step 503. If it is determined that the power of the VTR is turned off, the program advances from the step 503 to the step 504 to turn on a power button of the VTR, and hence the output port 23 is set at a H level to turn the analog switch 39 on (at the step 505). Thus, a voice associated with a preset television channel is transmitted from the audio output 4 of the VTR through the amplifying circuit 34 onto the telephone line for about 5 seconds (at the step 506). Accordingly, the user can confirm that the power of the VTR is turned ON. Next, in order to select a desired channel, the 1 channel (1CH), for instance, he depresses the button "#" of the pushphone and then depresses the "1" button. Upon generation of an associated tone, the program advances from the step 530 to the step 531 where the terminals of a channel-up button built in the operating section 1 is short-circuited for a predetermined number of times until the 1 channel is reached. To determine that the 1 channel is reached, a channel indication output from the display section 2 is read by the CPU. At the subsequent step 532, the analog switch 39 is turned on so as to enable the user to hear a voice of the thus selected television channel. The analog switch (not shown) is arranged to be turned off when the user hangs up the telephone to restore the present device in its standby mode.

Further, the present device is arranged to allow the user to set in units of 30 minutes a time period for picture recording and a time period until the initiation of picture recording by operating the "#" and "*" button, respectively. For instance, in case that the user desires to initiate a two-hour picture recording after one hour, he should depress the "*" button of the pushphone twice and the "#" button four times, respectively. As a result, terminals of a start button and a picture recording button of a one-touch motion type of timer built in the operating section 1 of the VTR are short-circuited for predetermined numbers of times, respectively, to set the timer in a desired manner. Further, in case that the user wishes to immediately initiate the two-hour picture recording, he should depress the "#" button four times. Furthermore, if he wishes to effect the picture recording, with no time parameters preset, the "*" button and the "1" button should be depressed. In this case, in order to cancel the picture recording mode, he should depress the STOP button manually after coming his home, or transmit the "0" tone via remote control operation, so that the program advances through the step 503 to the step 508 where the power of the VTR is turned off to cancel the picture recording. As apparent from FIGS. 3 and 5, rewind, fast wind, playback, stop operations of the VTR are also performable by remote control. In the meantime, some VTRs require a stop operation when the operation should be changed from rewind to playback, for instance. In the remote control of such type of VTR, a remote control signal for stopping should be transmitted each time the operation mode is changed, resulting in a complicated operation. In this embodiment, as shown in the steps 515 and 518, an operation is added to automatically stop the VTR upon reception of a predetermined remote control signal, to thereby effect the remote control efficiently.

Figure 6:
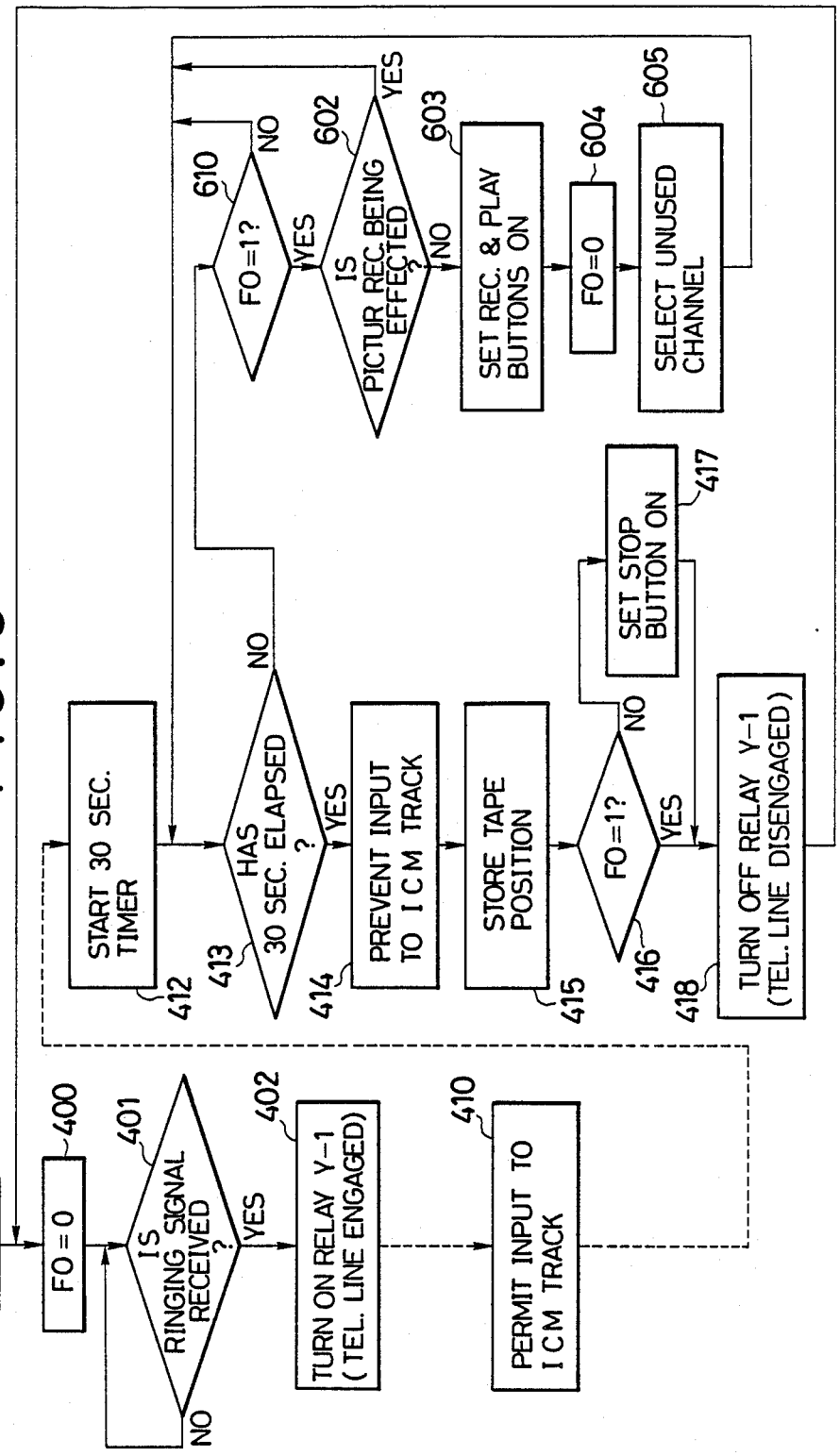

Further, the present device is aranged to permit the I.C.M. recording even when the I.C.M. is received during the picture recording of the VTR, as mentioned above. However, in the picture recording effected by the use of the timer, the picture recording mode is cancelled and at the same time the power of the VTR is automatically turned off. Accordingly, the power of the VTR is turned off and the tape is stopped driving if the timer associated with picture recording times out while the I.C.M. is still being recorded. This makes it impossible to fully record the I.C.M. onto the tape. In the flowchart of FIG. 6, the steps 601-605 are added in addition to the steps 400-418 corresponding to those of FIG. 4, to eliminate such problem. In the meantime, part of the steps is not illustrated, and portions common to those mentioned above will be explained in a simplified manner. As mentioned above, upon reception of the ringing signal, the relay Y-1 is turned on to engage the telephone lines from each other (at the steps 401, 402). Then, the I.C.M. is permitted to be supplied to and recorded on the sound track (at the step 410), and hence a 30 second timer for setting the time period for message recording is started. Here, it is assumed that an incoming call is received during the picture recording and thus the tape is running. At the subsequent step 413, it is checked whether or not the I.C.M. has been recorded for 30 seconds. If 30 seconds have not elapsed, the program advances to the additional step 601. As mentioned above, since the flag FO is set to "1", the program further advances to the step 602 to check whether or not the VTR is being operated in the picture recording mode. In this embodiment, since the display section 2 of FIG. 1 is so arranged as to indicate a remaining time period for picture recording by timer, the output of the display section is supplied to the CPU where it is checked thereupon by program whether or not the picture recording is being effected. Upon elapse of 30 seconds for I.C.M. recording, with the VTR operated in picture recording mode, the program advances to the abovementioned step 414 to cancel the I.C.M. recording mode and permit the restoration to the standby mode.

On the other hand, if the timer for picture recording in the VTR times out before elapse of 30 seconds, the recording time is indicated as "000" in the display section 2 which is read by the CPU, and the program advances to the subsequent step 603 where the REC button and the PLAY button are turned on (the contacts of these buttons are short-circuited) to continue the picture recording of the VTR. In this case, the picture recording is continued irrespective of the operation of the recording timer. At the subsequent step 604, the flag Fo is cleared to "0" (as mentioned above). Then, the unused channel such as the 5 channel is selected at the step 605 so as not to record an unselected television program on the tape. Thereafter, the program returns to the step 413, and hence the program repetitively executes a processing along a loop consisting of the steps 413, 601 and 413 until 30 seconds have elapsed. Upon elapse of 30 seconds, the program advances to the step 414 as mentioned above, to initiate the restration processing. At that time, since at the step 416 the flag FO is set to "0", the program passes through the step 417. Accordingly, the STOP button is turned on (the terminal thereof is short-circuited), so that the operation of the VTR is disabled, and the tape travel is terminated, and hence the device restores to the standby mode (a third restore means).

Figure 7:
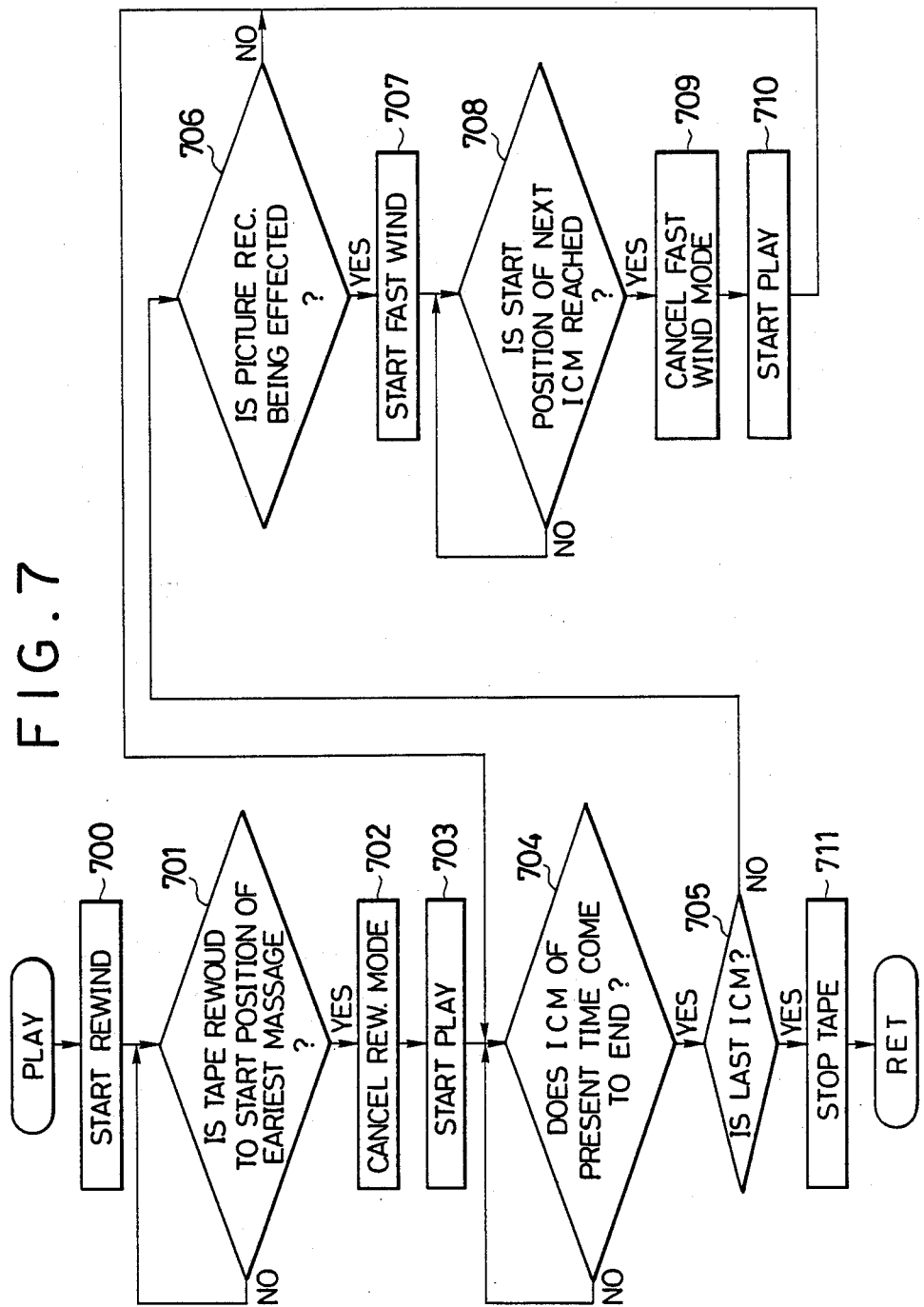

As mentioned above, the picture recording of television programs and the sound recording of I.C.M. are made on the VTR tape at the same tape travel positions or at different tape positions and in a random order. Accordingly, it is difficult and inefficient for the user to manually select and playback I.C.M.. The flowchart of FIG. 7 is arranged to automatically select and playback the I.C.M. recorded on the tape. Upon depression of the operating button 12 (PLAY) of FIG. 1, the program jumps to the flowchart of FIG. 7. At the step 700, the VTR tape is started to be rewound. Although no illustration is given, the present device is so arranged as to reject a further incoming call reached thereafter. At the subsequent step 701, it is checked whether or not the tape has been rewound up to its start position of the messages by counting pulses backward, which are supplied from the rotary switch output 3. In some cases, a television program is recorded on the tape at a location near the start position of the tape. In this case, the start position of the message is inconsistent with that of the tape, but is consistent with the first one of respective message start positions in the tape which have been stored at the step 411. When the tape has been rewound up to this tape position, the rewind mode is cancelled and then the tape is started to be played back (at the steps 702, 703). A sound reproduced from the tape is amplified through a loudspeaker (not shown) of a television set which is connected to the VTR. When the sound-reproduction has been made up to the end of the message (the end position has been stored at the step 415), it is checked whether or not the message corresponds to the latest one, at the step 705. Such check is effected by determining whether or not the tape position reaches its maximum value. If it is determined that the message is not the latest one, the program advances to the step 706 to check whether or not a subsequent tape content is composed of recorded scenes alone. This is checked by determining whether or not a discontinuity is found between the end position of this message and the start position of the subsequent message. If the subsequent tape content is composed of recorded scenes alone, the program advances to the next step 707 to effect fast winding of the tape. At the next step 708, it is checked whether or not the start position of the next message has been reached. If such position is reached, the fast winding mode is cancelled, and then the playback operation of tape is initiated (at the steps 709 and 710). Thereafter, the program returns to the step 704 to repeat the above-mentioned processing. Then, the program advances from the step 705 to the step 711 to stop the tape when the end position of the messages has ben reached.

A similar automatic selection/playback function operable in watching and listening recorded contents of the VTR may be provided in the present device although such function is not inevitably necessary since each of television programs is usually long in recording time. For that reason, a flowchart achieving such function is omitted. Further, a function of rewinding the video tape up to a start position of each of television programs may be utilized, which function is involved in the VTR.

Although the present invention is applied, by way of example, to a commercially available VTR, in the preferred embodiments mentioned above, it is also applicable to a device under development which uses a disc as a recording medium. Further, in the embodiments, a voice synthesizer is employed in the message recording section. Alternatively, in case of applying the present invention to a VTR of the recently developed type with two video tapes, one of these tapes may be employed solely for an automatic telephone answering device.

Although certain preferred embodiments have been shown and described, it should be understood that many changes and modifications may be made therein without departing from the scope of the invention.

What is claimed is:

1. An automatic telephone answering picture/sound recording system, comprising:
   picture/sound recording means for receiving a TV broadcast; and
   message recording means responsive to a telephone incoming call for recording an incoming message from a calling party;
   wherein the both of said employ a recording media of said picture/sound recording means.

2. A system according to claim 1, including means for controlling said picture/sound recording means and said message recording means to record the TV broadcast and the incoming message simultaneously on the common video tape.

3. A system according to claim 2, wherein said controlling means includes means for controlling said picture/sound recording means and said message recording means to record said broadcast and said incoming message selectively and independently on the common video tape.

4. An automatic telephone answering picture/sound recording device as claimed in claim 1, further comprising:
   storing means for storing therein start and stop positions of each incoming message recorded onto the video tape, respectively; and
   playback means for automatically discriminating message recording portions of the video tape from picture recording portions thereof in accordance with stored contents of said storing means to skip picture recording portions at a high speed and playback only the incoming messages.

5. An automatic telephone answering picture/sound recording device as claimed in claim 1, further comprising:
   means for storing start and end position of each picture/sound recording of telecasts on the video tape; and
   playback means for automatically discriminating picture recording portions of the video tape from message recording portions thereof in accordance with stored contents of said storing means to skip only message recording portions at a high speed and playback only the telecasts recordings.

6. A system according to claim 1, wherein said picture/sound recording means comprises a video tape recorder and said message recording means comprises a telephone answering device, said video tape recorder and said telephone answering device employing said recording media of said video tape recorder.

7. An automatic telephone answering picture/sound recording device for recording both an incoming message from a calling party and a telecast onto a common video tape, comprising:
   ringing signal detecting means for detecting a ringing signal sent through a telephone line;
   engaging means for engaging the telephone line upon detection of said ringing signal;
   picture/sound recording means for effecting a picture/sound recording of the telecast;
   means for setting said picture/sound recording means in a ready mode for recording a telecast upon detection of said ringing signal;
   answering means for transmitting an outgoing message upon engagement of the telephone line;
   disengaging means for cancelling said ready mode upon completion of the transmission of the outgoing message;
   recording means for recording the incoming message onto said video tape after cancellation of said ready mode; and
   first restore means for detecting a completion of recordation of an incoming message, and in response, cancelling a recording operation of said recording means, and thereafter establishing a standby mode to receive a subsequent incoming call when the incoming message recording is completed.

8. An automatic telephone answering picture/sound recording device as claimed in claim 7, further comprising:
   detecting means for detecting whether or not a telecast is being recorded when the ringing signal is received;
   said recording means including means for recording the incoming message onto a predetermined sound track of the video tape while said telecast recording is being effected; and
   second restore means for disabling a message recording operation of said message recording means and setting said message recording means in the standby mode to be ready for reception of a subsequent incoming telephone call, and for permitting the telecast recording to continue, after completion of incoming message recording.

9. An automatic telephone answering picture/sound recording device as claimed in claim 4, further comprising:
   detecting means for detecting whether or not said picture/sound recording means is operating while an incoming message from a calling party is being recorded;

restarting means for restarting an operation of a picture/sound recording means when said detecting means detects that the picture/sound recording means is rendered disabled during recording of the incoming message by said message recording means, so as to continue the message recording; and third restore means for disabling the operation of the picture/sound recording means and establishing the standby mode to be ready for reception of a subsequent incoming telephone call, after completion of incoming message recording by said recording means.

10. A device according to claim 9, including means for selecting an unused television channel of the picture/sound recording device in a case wherein no recording of a telecast is effected during the incoming message recording.

11. An automatic telephone answering picture/sound recording device as claimed in claim 7, further comprising:

storing means for storing therein start and stop positions of each incoming message recorded onto the video tape, respectively; and playback means for automatically discriminating message recording portions of the video tape from picture recording portions thereof in accordance with stored contents of said storing means to skip picture recording portions at a high speed and playback only the incoming messages.

12. An automatic telephone answering picture/sound recording device as claimed in claim 4, further comprising:

means for storing start and end positions of each picture/sound recording of telecasts on the video tape; and playback means for automatically discriminating picture recording portions of the video tape from message recording portions thereof in accordance with stored contents of said storing means to skip only message recording portions at a high speed and playback only the telecasts recordings.

* * * * *

UNITED STATES PATENT AND TRADEMARK OFFICE
CERTIFICATE OF CORRECTION

PATENT NO.  : 4,829,555
DATED       : May 9, 1989
INVENTOR(S) : Kazuo HASHIMOTO

It is certified that error appears in the above-identified patent and that said Letters Patent is hereby corrected as shown below:

On the title page, line 12 of the Abstract, change "video type" to --video tape--.

At column 9, line 44, after "said" insert --means--.

Signed and Sealed this

Sixth Day of April, 1993

*Attest:*

STEPHEN G. KUNIN

*Attesting Officer*   Acting Commissioner of Patents and Trademarks